(12) United States Patent
Como et al.

(10) Patent No.: US 10,384,742 B2
(45) Date of Patent: Aug. 20, 2019

(54) SYSTEM FOR CONTROLLING THE MOTION OF AN IMPULSIVE-TYPE HUMAN POWERED VEHICLE

(71) Applicant: ZEHUS S.p.A., Milan (IT)

(72) Inventors: Matteo Como, Milan (IT); Sergio Matteo Savaresi, Cremona (IT); Paolo Lisanti, Lallio (IT); Giovanni Alli, Legnano (IT); Fabio Busnelli, Saronno (IT)

(73) Assignee: ZEHUS S.P.A., Milan (IT)

( * ) Notice: Subject to any disclaimer, the term of this patent is extended or adjusted under 35 U.S.C. 154(b) by 31 days.

(21) Appl. No.: 15/525,595

(22) PCT Filed: Oct. 6, 2015

(86) PCT No.: PCT/IB2015/057633
§ 371 (c)(1),
(2) Date: May 10, 2017

(87) PCT Pub. No.: WO2016/079614
PCT Pub. Date: May 26, 2016

(65) Prior Publication Data
US 2017/0313380 A1    Nov. 2, 2017

(30) Foreign Application Priority Data
Nov. 18, 2014    (IT) .............................. MI2014A1985

(51) Int. Cl.
*B62M 6/50*    (2010.01)
*B62M 6/45*    (2010.01)
(Continued)

(52) U.S. Cl.
CPC .............. *B62M 6/50* (2013.01); *B62K 3/002* (2013.01); *B62M 6/45* (2013.01); *B62M 6/90* (2013.01); *B62K 2204/00* (2013.01)

(58) Field of Classification Search
CPC .................................. A63C 17/12; B62M 6/40
(Continued)

(56) References Cited

U.S. PATENT DOCUMENTS 5,234,066 A * 8/1993 Ahsing .................. A61G 5/045
180/11
5,818,189 A * 10/1998 Uchiyama .............. A61G 5/045
318/488

(Continued)

FOREIGN PATENT DOCUMENTS

CN    1347826 A    5/2002
CN    1629006 A    6/2005
(Continued)

OTHER PUBLICATIONS

Italian Search Report dated Jul. 3, 2015 from counterpart IT App No. MI20141985.
(Continued)

*Primary Examiner* — Jeffrey J Restifo
(74) *Attorney, Agent, or Firm* — Shuttleworth & Ingersoll, PLC; Timothy J. Klima

(57) ABSTRACT

A system (1) for controlling the motion of an impulsive-type human-powered vehicle (100), includes:
a motor (2) associable to at least one vehicle (100) driving element, suitable for generating a total torque/driving force (T);
a system (4) for storing energy to be supplied to the motor (2);
a sensor (5) for detecting the vehicle (100) longitudinal speed (v);
a module (7) for controlling a main torque/driving force (T') of the motor (2) based on at least the signal representative of the vehicle (100) longitudinal speed (v);
(Continued)

a module (9) for determining the vehicle longitudinal acceleration (Ax);
a module (8) for estimating the presence or absence of a thrust ($F_k$) of the user on the vehicle (100);
an activation signal when it is estimated the absence of the thrust ($F_k$) of the user:
a deactivation signal when it is estimated the presence of the thrust ($F_k$) of the user.

20 Claims, 2 Drawing Sheets

(51) Int. Cl.
*B62K 3/00* (2006.01)
*B62M 6/90* (2010.01)

(58) Field of Classification Search
USPC .............................................. 180/65.26, 181
See application file for complete search history.

(56) References Cited

U.S. PATENT DOCUMENTS

| | | | | |
|---|---|---|---|---|
| 5,878,829 A * | 3/1999 | Kanno | A61G 5/045 180/65.51 |
| 6,003,627 A * | 12/1999 | Ishida | A61G 5/045 180/206.2 |
| 6,009,964 A * | 1/2000 | Ishida | A61G 5/045 180/6.5 |
| 6,015,021 A * | 1/2000 | Tanaka | B62M 6/45 180/206.2 |
| 6,050,357 A * | 4/2000 | Staelin | A63C 17/004 180/65.1 |
| 6,059,062 A * | 5/2000 | Staelin | A63C 17/12 180/181 |
| 6,230,831 B1 * | 5/2001 | Ogata | A61G 5/045 180/65.1 |
| 6,288,505 B1 * | 9/2001 | Heinzmann | A63C 17/12 180/181 |
| 6,302,226 B1 * | 10/2001 | Kanno | A61G 5/02 180/6.5 |
| 6,651,766 B2 * | 11/2003 | Kamen | A63C 17/12 180/21 |
| 6,765,323 B2 * | 7/2004 | Takano | B60L 11/1801 310/68 B |
| 6,796,396 B2 * | 9/2004 | Kamen | A63C 17/12 180/272 |
| 6,840,340 B2 * | 1/2005 | Inoue | A61G 5/045 180/19.3 |
| 6,929,080 B2 * | 8/2005 | Kamen | A61G 5/04 180/181 |
| 7,275,607 B2 * | 10/2007 | Kamen | A63C 17/01 180/7.1 |
| 7,363,993 B2 * | 4/2008 | Ishii | A63C 17/08 180/7.1 |
| 7,481,291 B2 * | 1/2009 | Nishikawa | B62K 17/00 180/181 |
| 7,529,608 B2 | 5/2009 | Shimizu | |
| 7,706,935 B2 * | 4/2010 | Dube | B62M 6/45 180/169 |
| 8,256,545 B2 * | 9/2012 | Oikawa | B60L 15/2009 180/181 |
| 8,321,097 B2 * | 11/2012 | Vasiliotis | B62M 11/16 701/51 |
| 8,322,477 B2 * | 12/2012 | Kamen | A61G 5/046 180/181 |
| 8,532,877 B2 * | 9/2013 | Oikawa | B60L 15/2036 180/218 |
| 9,101,817 B2 * | 8/2015 | Doerksen | A63C 17/12 |
| 9,120,531 B2 | 9/2015 | Tanaka et al. | |
| 9,199,693 B2 * | 12/2015 | Arimune | B62M 6/45 |
| 9,216,792 B2 * | 12/2015 | Han | B62M 6/40 |
| 9,274,134 B2 * | 3/2016 | Lu | B62M 6/45 |
| 9,452,345 B2 * | 9/2016 | Doerksen | A63C 17/01 |
| 9,616,318 B2 * | 4/2017 | Rogers | A63C 17/12 |
| 9,638,285 B2 * | 5/2017 | Huang | B60L 11/18 |
| 9,643,077 B2 * | 5/2017 | Bigler | A63C 17/014 |
| 9,789,924 B2 * | 10/2017 | Kroymann | B62K 13/04 |
| 9,840,146 B2 * | 12/2017 | Lagant | B62M 6/45 |
| 9,908,580 B2 * | 3/2018 | Doerksen | B62K 11/007 |
| 9,999,827 B2 * | 6/2018 | Wood | A63C 17/12 |
| 10,160,503 B1 * | 12/2018 | Zheng | B62D 51/02 |
| 2002/0117341 A1 * | 8/2002 | Lan | B62K 3/002 180/181 |
| 2002/0170763 A1 * | 11/2002 | Townsend | B60L 15/20 180/220 |
| 2004/0206563 A1 * | 10/2004 | Murata | B62M 6/45 180/206.2 |
| 2013/0054068 A1 * | 2/2013 | Shoge | B62M 6/45 701/22 |
| 2014/0196968 A1 * | 7/2014 | Bieler | B62M 6/65 180/181 |

FOREIGN PATENT DOCUMENTS

| | | |
|---|---|---|
| CN | 103429490 A | 12/2013 |
| DE | 10053043 A1 | 9/2001 |
| DE | 102012201881 A1 | 1/2013 |
| EP | 1188660 A2 | 3/2002 |
| ES | 2024258 A6 | 2/1992 |
| GB | 2358716 A | 8/2001 |
| JP | 2007055544 A | 3/2007 |
| WO | 2012/163789 A1 | 12/2012 |

OTHER PUBLICATIONS

International Search Report in PCT/IB2015/057633 dated Dec. 10, 2015.
Written Opinion in PCT/IB2015/057633 dated Dec. 10, 2015.
Chinese Office Action dated Oct. 31, 2018 from counterpart Chinese App No. 201580062537.3.

* cited by examiner

SYSTEM FOR CONTROLLING THE MOTION OF AN IMPULSIVE-TYPE HUMAN POWERED VEHICLE

FIELD OF THE INVENTION

The present invention refers to a system for controlling the motion of an impulsive-type human-powered vehicle. The term "impulsive-type human-powered vehicle" means a vehicle operated by a driving force discontinuously applied by an user. Vehicles of this type are for example push scooters and skateboards, which are driven by discontinuous and therefore substantially impulsive thrusts, generally exerted by an user foot. Such vehicles are for example different from the bicycles because these latter are operated by exerting a substantially continuous torque by the user.

Specifically, the present invention refers to impulsive-type human powered vehicles provided with motion assisting means, in other words means adapted to supply an ancillary driving force in addition to the one supplied by the user, for example by an auxiliary motor.

Although the present description focuses on land vehicles, the system can find an application also in impulsive-type human-powered vehicles of a different type, such as for example rowboats.

PRIOR ART

Recently, impulsive-type human-powered vehicles provided with auxiliary motors have found an increasing acceptance, mainly due to road congestions and environmental problems which have led to the demand of alternative vehicles, preferably low-cost and having a low environmental impact.

For example, push scooters provided with an auxiliary electric motor supplying a driving power in addition to the power supplied by the user, are known. The operation of the motor is usually commanded by the user via interface devices, such as levers or knobs.

Unfortunately, such vehicles have an unusual behavior with respect to the behavior which they would have without the auxiliary motors. Moreover, the presence of the interface devices for controlling the vehicle can distract the driving user.

The document WO 2012/163789 describes a system for controlling the motion of an impulsive-type human-powered vehicle (100), particularly a push scooter, wherein the presence/absence of user a thrust is detected, and based on such detection, an electric motor commanding the push scooter driving wheels is activated/deactivated. Determining the presence/absence of the user thrust is based on the detected speed plot of the vehicle, particularly assuming that, following a speed peak due to the thrust, there is a sudden deceleration, determined by the discontinuation of the same thrust. Such principle for determining the presence/absence of the thrust, based on the speed plot can however lead to erroneous assumptions when an analogous speed plot is produced by causes different from the thrust, such as for example sudden variations of the path slope, humps, etcetera, with the risk of turning on the motor by means of the system also in cases wherein this should not occur.

SUMMARY OF THE INVENTION

Therefore, the problem, from which the present invention stems, is to provide a system for controlling the motion of an impulsive-type human-powered vehicle, so that, when it is associated to the vehicle, this latter, despite the provision of auxiliary actuators reducing the user effort, has a behavior similar to the one the vehicle would have without such system, making therefor superfluous the interface devices commanding the vehicle itself by the user during the operation. A further problem, from which the present invention stems, consists of making available a system for controlling the motion of an impulse-type human-powered vehicle which is sufficiently strong, such as to avoid to operate the auxiliary actuators in erroneous circumstances, with the risk of unusual behaviors of the vehicle itself.

Such problem is solved by a system for controlling the motion of an impulsive-type human-powered vehicle as disclosed herein.

The present disclosure also defines possible advantageous embodiments of the invention.

BRIEF DESCRIPTION OF THE DRAWINGS

In order to better understand the invention and appreciate the advantages thereof, some exemplifying non limiting embodiments of the invention will be described in the following with reference to the accompanying figures, wherein.

DETAILED DESCRIPTION OF THE INVENTION

Figure 1:
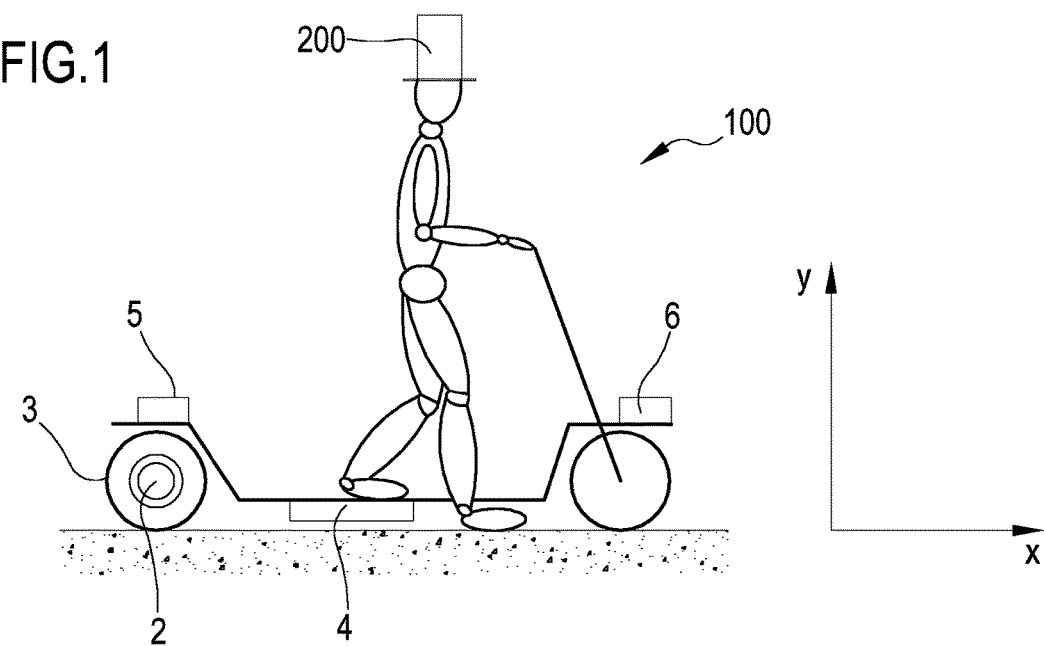
FIG. 1 is a schematic view of an impulsive-type human-powered vehicle of a system according to the invention.

FIG. 1 schematically shows an impulsive-type human-powered vehicle 100 with an user 200 on the same vehicle. The vehicle 100 shown in FIG. 1 is a push scooter. Alternatively, the vehicle 100 can be, for example, a skateboard or similar vehicle drivable by impulsive thrusts exerted by the user foot. Alternatively, the vehicle 100 can be, for example, a wheelchair driven by impulsive thrusts exerted by the user on the wheels of the same, or another analogous impulsive thrust vehicle driven by the action of the arms. Alternatively, the vehicle can be a not land type vehicle, for example a rowboat.

Figure 2:
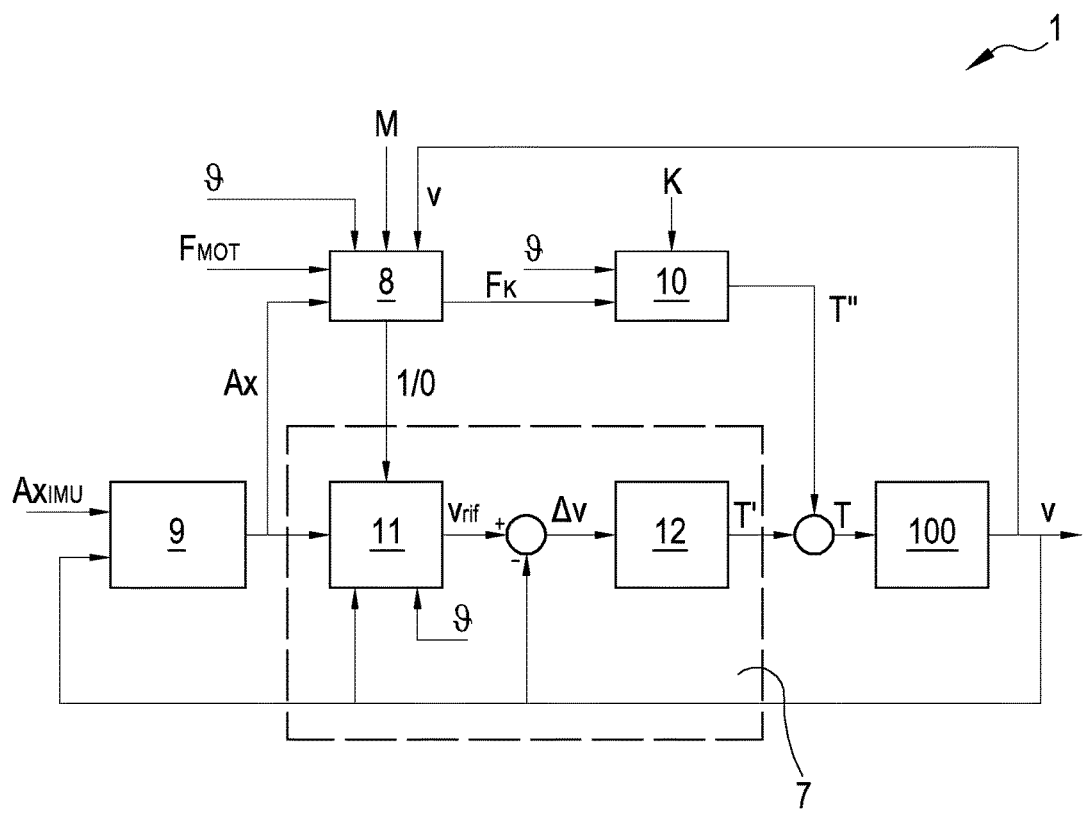
FIG. 2 is a block diagram of a system for controlling the motion of an impulsive-type human-powered vehicle according to a possible embodiment of the invention.

The vehicle 100 is provided with a system 1 for controlling its motion, shown by the block diagram in its possible embodiment of FIG. 2. The system 1 is suitable to deliver a force in addition to the human thrust provided by the user 200 under predetermined conditions, as it will be better described in the following.

Referring again to FIG. 1, the system 1 comprises a motor 2 associated to at least one driving wheel 3 of the vehicle 100 (or a different power element, for example a motor provided with propellers in case of a non land vehicle) in order to provide power to the same under predetermined conditions. Obviously, plural driving wheels, if present, can be associated to the motor 2. Moreover, the system 1 comprises an energy storing system 4 supplying the motor 2 so that this latter can produce power. For example, the motor 1 can comprise an electric motor and the energy storing system 4 can comprise one or more batteries. Alternatively, the motor 2 and energy storing system 4 can be of a different type. For example, the motor 1 can comprise an internal combustion engine and the energy storing system 4 can comprise a fuel tank.

Moreover, the system 1 comprises a sensor 5 for detecting the vehicle speed v, suitable for generating a signal representative of such speed. For example, the speed sensor 5 can be associated to a vehicle wheel, for example to the driving wheels 3. By means of the wheel rotation speed, it is possible to determine the vehicle longitudinal speed v, in other words the speed along the axis x of a x-y axis system integral with the vehicle 100, according to what has been shown in FIG. 1.

Further, according to a possible embodiment, the system 1 comprises an inertial measuring unit 6 suitable for measuring at least the vehicle longitudinal acceleration (in other words the acceleration according to the axis x of FIG. 1, as previously described) and for generating a signal representative of the same.

According to a possible embodiment, moreover the system 1 comprises a sensor (not shown in the figures) for detecting the slope $\vartheta$ of the path which the vehicle itself is moving along, suitable for generating a signal representative of the slope. The slope $\vartheta$ is given by the angle between the axis x in FIG. 1, integral with the vehicle, and the axis x of an absolute system not shown in the figures, so that $\vartheta$ is zero when the two axes x coincide.

Alternatively, the inertial measuring unit 6 can substitute the function of the slope sensor, which to this end can be further arranged in order to detect at least also the vehicle 100 vertical acceleration (in other words the acceleration according to the axis y of the axis system shown in FIG. 1) and to generate a signal representative of the vertical acceleration.

Referring now to FIG. 2, it shows a block illustrative diagram of the system 1 according to a possible embodiment of the invention.

The system 1 comprises a module 7 for controlling a main driving torque T' of the electric motor 2 associated to the vehicle 100 based on the effective speed v of the same. Specifically, the vehicle effective speed v can be obtained from the signal representative of the vehicle speed generated by the speed sensor 5. As it will be illustrated in the following, preferably the control module 7 performs a closed-loop control of the vehicle speed, by acting on the main torque T'.

Further, the system 1 comprises a module 8 for estimating the presence or absence of a thrust $F_k$ of the user. For example, with reference to a push scooter, the module 8 is capable of determining if the user is exerting a thrust by his/her foot for causing the push scooter to advance. The module 8 is connected to the module 7 for controlling the main driving torque, and is configured in order to supply:

an activation signal (usually indicated by the signal 1 in FIG. 2) to the module 7 controlling the main torque T', when it is estimated the absence of the thrust $F_k$ of the user;

a deactivation signal (usually indicated with the signal 0 in FIG. 2) to the module 7 controlling the main torque T', when it is estimated the presence of the thrust $F_k$ of the user.

Such control principle causes, after the application of the user thrust $F_k$, in other words when the thrust is determined as ceased and therefore absent, the module 7 controlling the main torque T' to start operating so that the motor 2 supplies such main torque T' to the driving wheel 3. As it will be described in the following, the main torque T' is preferably supplied in a non impulsive mode. Instead, when the module 8 determines the user thrust $F_k$ is in progress, the main torque T' control by the module 7, is deactivated and therefore the torque T' is preferably equal to zero.

The thrust estimating module 8 can be differently configured because the thrust can be determined according to plural modes. Particularly, the thrust determining module 8 receives, at the input, at least one signal representative of the vehicle longitudinal acceleration Ax. This latter signal can be supplied to the module 9 for determining the vehicle longitudinal acceleration, configured, for example, for determining the acceleration by inferring the speed, known from the signal representative of the longitudinal speed supplied by the speed sensor 5. Alternatively, if an inertial measuring unit 6 is present, it is possible to obtain such signal representing the longitudinal acceleration Ax from a measured longitudinal acceleration signal $A_{xIMU}$ generated by the inertial measuring unit 6 itself, preferably pre-processed by the module 9 itself, as it will be better explained in the following.

Further, the thrust estimating module 8 receives, at the input, preferably the signal representative of the speed v supplied by the speed sensor 5.

Moreover, the thrust estimating module 8 optionally can receive, at the input, one signal representative of the path slope $\vartheta$ if the system is provided with the corresponding slope sensor.

In addition, the module 8 can relate the user thrust to the overall mass M of the vehicle and user. Such parameter can be determined in a fixed way, in a predetermined way or alternatively, can be determined by a module for determining the vehicle mass+user mass, not shown in the figures.

Further, the module 8 can relate its estimate of the user thrust to a signal representing the driving force $F_{mot}$ exerted by the motor 2. Such parameter is known and is obtainable from the driving torque supplied by the motor, which is controlled by the system itself, for example by the current supplying the motor if this latter is an electric one.

According to a possible embodiment, the system 1 further comprises a thrust amplifying module 10 adapted to generate an auxiliary torque command T" which must be supplied by the motor in addition to the main torque T', which is instead commanded by the module 7. The total torque T supplied by the motor is therefore given by the sum of the main torque T', commanded by the module 7, and the auxiliary torque T", commanded by the thrust amplifying module 10. Such optional module 10 has the function of partially changing the trend of the vehicle generated by the combined contribution of the human thrust and the main torque T' in the different motion steps. For example, the thrust amplifying module 10 can require the motor an additional torque in the presence of path upgrades, and/or can amplify the effect of the thrust $F_k$ in a time period when this is supplied. The thrust amplifying module 10 can therefore optionally receive, at the input, the signal representative of the path slope $\vartheta$, if the corresponding sensor is available, and the signal representative of the user thrust $F_k$ as determined by the module 8. The amount of the torque amplification can be adjusted by the user by regulating one or more operative parameters of the module 10 itself. Traditionally, such parameters are indicated by the parameter k in FIG. 2, which indicates just a parameter adjustable by the user. The parameter k adjustment can be made by an user interface device (not shown) or alternatively by a cellular phone or smartphone, connectable to the system 1 by a communication module not shown in Figures.

Now, a detailed description of the preferred embodiments of the single modules of the system 1 will be given.

Module 7 for Controlling the Motor Main Torque T'

Advantageously, the module 7 for controlling the motor driving torque T' comprises a module 11 generating the reference speed $v_{ref}$ and a module 12 controlling the vehicle speed by a closed loop.

The module 11 generates the reference speed $v_{ref}$ which the vehicle should follow as precisely as possible following the thrust applied by the user. The reference speed $v_{ref}$ plot can be selected in several different ways. Preferably, the reference speed $v_{ref}$ is such to be equal to the effective speed v detected by the speed sensor 5 at the instant when the main torque control module 7 is activated by the module 8. In this way, the electric motor starts operating gradually, avoiding sudden vehicle accelerations. Advantageously, to this end, the reference speed $v_{ref}$ generating module 11 receives, at the input, the signal representative of the vehicle speed v.

The reference speed $v_{ref}$ can be set as a curve gradually decreasing with the time from the effective speed v detected at the activation time of the control module 7, in order to simulate a condition of limited frictions for the vehicle motion.

Figure 4:
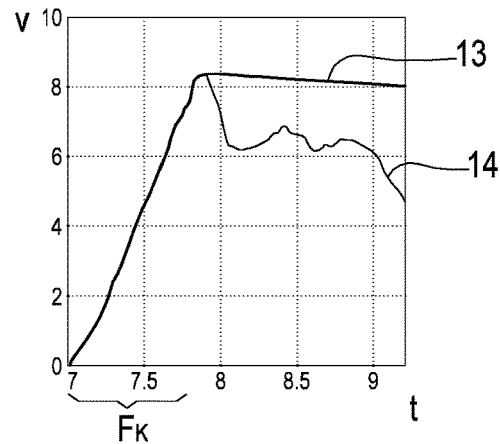
FIG. 4 illustrates a possible comparison between the speed v when the impulsive-type human-powered vehicle equipped with a system according to the invention is started, and the same vehicle without such system, all the conditions being equal during the time t.

The time (t)-speed (v) diagram of FIG. 4 shows a comparison between the reference speed $v_{ref}$ in case the control module is activated (curve 13) and the effective speed of the vehicle in case the control module is not activated (curve 14) in a time interval of the vehicle moving from a standing start. Initially, in the time period wherein the thrust $F_k$ is applied by the user, the two curves coincide from the instant wherein the control module has been deactivated. After such time interval, in case the vehicle is not provided with the control module or in case the control module is deactivated, the speed curve exhibits a variable trend which can for example depend on terrain unevenness or on the presence of downgrades and upgrades. Vice-versa, the reference speed, set in the figure as gradually decreasing, is independent from the effective conditions encountered by the vehicle during its path.

Alternatively, the reference speed $v_{ref}$ can be selected as a gradually increasing curve, in order to simulate a behavior of the vehicle along a downgrade.

According to more sophisticated models, the reference speed $v_{ref}$ trend is not determined in a fixed way, but can change as a function of the effective conditions encountered by the vehicle during its motion. For example, it is possible to generate a reference speed $v_{ref}$ simulating, and simultaneously reducing the effort by driver, the presence of upgrades and downgrades, in order to provide to the vehicle a behavior as natural as possible. To this end, the reference speed $v_{ref}$ can be determined as a function of the signal representative of the path slope $\vartheta$, generated by the corresponding slope sensor or from the signal representative of the longitudinal acceleration Ax (or also possibly from the vertical acceleration) Ay, if the associated sensors are provided.

Advantageously, the closed-loop speed control module 12 modulates the motor main torque T' so that the vehicle will follow the reference speed $v_{ref}$ generated by the reference speed generating module 11. For example, the module 12 can comprise a controller PID, or alternatively, more sophisticated controllers, for example fuzzy-logic controllers. The module 12 receives, at the input, a signal representative of the difference Δv between the vehicle effective longitudinal speed v, measured by the speed sensor 5, and the reference speed $v_{ref}$ as generated by the module 11, and determines the main torque T' so that such speeds tend to be coincident to each other.

Module 9 for Determining the Longitudinal Acceleration Ax

The longitudinal acceleration Ax determining module 9 has the function of generating a signal representative of the vehicle longitudinal acceleration Ax and can be differently configured according to the available sensors in the system.

In case the inertial measuring unit 6 is not present, the module 9 can be configured for determining the vehicle longitudinal acceleration Ax from the signal representative of the longitudinal speed v from the speed sensor 5, by deriving the speed itself. Preferably, the module 5 comprises, in this case, a high-pass filter for filtering the signal from the speed sensor.

In case the inertial measuring unit 6 is provided, the signal representative of the acceleration Ax provided by this latter, can be directly used, at the input, in the other modules, according to what has been previously described. In such case, the module 9 does not perform any processing of the signal. Alternatively, preferably, the module 9 comprises a filter, still more preferably a complementary filter. In this way, by means of the signal representative of the measured longitudinal acceleration $A_{IMU}$ from the inertial measuring unit 6, it is obtained the signal representative of the longitudinal acceleration Ax which is used, at the input, by the other system modules.

Module 8 for Determining the User Thrust

The module 8 is configured for determining the presence or absence of the thrust $F_k$ by the user. By determining the presence or not of such thrust, the module 8 supplies a deactivation or activation signal to the module 7 for controlling the main torque T', particularly to the reference speed generating module 11.

A possible principle for determining such thrust $F_k$ can be based on a balance of the forces acting on the vehicle 100, according to the following formula:

$$M\dot{v}=-\eta(v)+F_k+F_{mot}-Mg\sin(\vartheta) \quad (1)$$

M is the mass of the user-vehicle unit. As previously said, the mass can be considered as a fixed and known parameter, by knowing the vehicle mass to which a mass of an average user is added.

Alternatively, the mass M can be calculated in a mass estimating module (not shown in the figures) by known algorithms, for example by Kalman filters. Further known systems for determining the vehicle mass M from signals representative of cinematic and/or dynamic magnitudes of the vehicle are for example described in the following articles:

Xiaobin Zhang; Liangfei Xu; Jianqiu Li; Minggao Ouyang, "Real-Time Estimation of Vehicle Mass and Road Grade Based on Multi-Sensor Data Fusion," Vehicle Power and Propulsion Conference (VPPC), 2013 *IEEE*, vol., no., pp. 1,7, 15-18 Oct. 2013

Rhode, S.; Gauterin, F., "Vehicle mass estimation using a total least-squares approach," Intelligent Transportation Systems (ITSC), 2012 15th *International IEEE Conference on*, vol., no., pp. 1584,1589, 16-19 Sep. 2012

Fathy, H. K.; Dongsoo Kang; Stein, J. L., "Online vehicle mass estimation using recursive least squares and supervisory data extraction," *American Control Conference*, 2008, vol., no., pp. 1842,1848, 11-13 Jun. 2008 doi: 10.1109/ACC.2008.4586760

McIntyre, M. L.; Ghotikar, T. J.; Vahidi, A.; Xubin Song; Dawson, D. M., "A Two-Stage Lyapunov-Based Estimator for Estimation of Vehicle Mass and Road Grade," *Vehicular Technology, IEEE Transactions on*, vol. 58, no. 7, pp. 3177,3185, September 2009 doi: 10.1109/TVT.2009.2014385

$\dot{v}$ is the vehicle acceleration obtainable according to the previously described modes with reference to the module 9 for determining the signal representative of the vehicle longitudinal acceleration Ax.

$\eta(v)$ is the so called "coasting down" function of the vehicle, and represents the value of the frictions acting on the vehicles as a function of its longitudinal speed.

$F_{mot}$ is the total force of the motor, which is a known parameter because, as explained before, the total torque T of the motor is controlled by means of the modules 7 and 10, if present.

Mg sin($\vartheta$) is the contribution of the gravity, wherein g is the gravitational acceleration and $\vartheta$ is the path slope along which the vehicle moves. If the system is not provided with a sensor suitable for determining the path slope, the term Mg sin($\vartheta$) can be disregarded, and the formula for calculating the thrust exerted by the user can be simplified as follows:

$$M\dot{v} = -\eta(v) + F_k + F_{mot} \quad (2)$$

The user thrust $F_k$ in a determined instant can be obtained by inverting the formula (1) or formula (2).

Obviously, also the friction term $\eta(v)$ and/or the driving force $F_{mot}$ can possibly be disregarded. In such case, the estimation of the thrust $F_k$ will be less accurate.

With reference to the coasting down function $\eta(v)$, it can be experimentally determined for example by letting the vehicle freely move along a downgrade until it spontaneously stops. According to this approach, the coasting down function is set only one time and varies only as a function of the detected vehicle speed v. However, such type of approach does not consider some factors such as the configuration of the road and/or the wear of the tyres, which affect the friction and therefore such function, modifying it during the vehicle operation.

According to a different approach, therefore, the coasting down function can be adaptively calculated during the vehicle operation, so that the estimate accounts for the variation of the conditions causing the friction, according to what has been discussed beforehand.

According to this approach, since a human-powered vehicle travels at low speeds the aerodynamic contribution (varying as the square of the speed) can be disregarded, so that the friction force as a function of the speed v can be obtained by the relation:

$$\eta(v) = \beta v + \gamma \quad (3)$$

wherein $\beta$ and $\gamma$ are parameters which should be determined and vary during the vehicle operation.

By introducing the formula (3) into the formula (1), assuming there is a step in which the user thrust $F_k$ has ended and therefore the vehicle moves following the reference speed $v_{ref}$ as determined by the module 11, which has low accelerations and therefore negligible, it is obtained:

$$0 = -\beta v + \gamma + F_{mot} - Mg \sin \vartheta \quad (4)$$

It is observed that in the formula (4), it is assumed that the term dependent on the slope is known, for example because it is available a slope sensor. Without such sensor, the formula (4) is:

$$0 = -\beta v - \gamma + F_{mot} \quad (5)$$

In this case, the unknown slope term is included in the term $\gamma$ to be determined.

The formulas (4) or (5) can be rewritten in a matrix form by the following linear relation:

$$Y = -[\beta \gamma] X \quad (6)$$

wherein Y and X include the known terms (the driving force $F_{mot}$, the possible gravitational contribution Mg sin $\vartheta$, the vehicle speed v).

Such equation, whose unknowns are the time-varying parameters $\beta$ and $\gamma$, can be solved, for example, with the mathematical approach known as "the least-squares method". Such approach determines the parameters $\beta$ and $\gamma$ at the considered instant k as a function of the parameters $\beta$ and $\gamma$ determined at the previous instant k−1 and also as a function of the known parameters as measured at the instant k (the driving force $F_{mot}$, the possible gravitational contribution Mg sin $\vartheta$, the vehicle speed v).

In order to prevent road disturbances, such as humps or user brakings, from affecting the estimate of the coasting down function, as described, they are excluded from the data calculation obtained when the vehicle effective speed v falls outside a predetermined range of the reference speed $v_{ref}$ as determined by the module 11. In other words, the detected data are accepted if $v_{ref} − a < v < v_{ref} + b$, wherein a and b are predetermined constants, while the data obtained in the opposite case are excluded. In other words, when the speed v falls in the range, called reference speed, it is activated the estimate of the parameters $\beta$ and $\gamma$, vice versa is deactivated and is maintained the estimate at the previous instant.

Advantageously, the module 8 is configured for estimating the presence of the user thrust $F_k$ only when the thrust $F_k$ value determined for example by the preceding modes, exceeds a first predetermined threshold value and for estimating the absence of such thrust $F_k$ when the thrust $F_k$ value falls below a second predetermined threshold value less than the first threshold value. Consequently, the signal activating the control module 7, particularly the reference speed generating module 11, is output when the determined value of the thrust $F_k$ falls below the second predetermined threshold value. Analogously, the signal deactivating the control module 7, particularly the reference speed generating module 11, is output when the determined thrust $F_k$ value exceeds the first predetermined threshold value.

Figure 3:
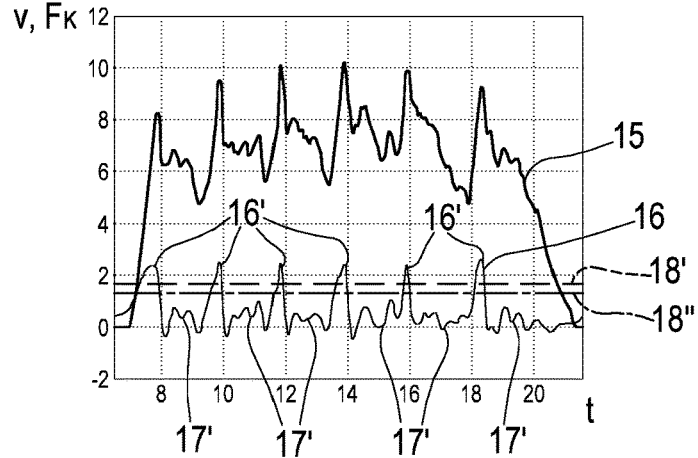
FIG. 3 illustrates a possible trend of the speed v of the impulsive-type human-powered vehicle equipped with a system according to the invention, and of the estimated thrust $F_k$ of the user as a function of time t.

The previous discussion is illustrated in FIG. 3, wherein a possible speed plot of the vehicle provided with the system 1 (curve 15) and a possible plot of the user thrust $F_k$ determined by the module 8 (curve 16) are drawn as a function of time t. The first thrust predetermined threshold value is indicated by the reference 18', while the second predetermined threshold value is indicated by reference 18".

The thrust $F_k$ plot has an impulsive trend characterized by peaks in the time intervals wherein the user exerts the thrust. In the lengths 16' where the thrust $F_k$ exceeds the first threshold value 18', the main torque controlling module 7 is deactivated, and also the speed exhibits sudden accelerations caused by the user thrust. In the lengths 17' wherein instead the estimated thrust $F_k$ goes again below the second threshold value 18", the main torque controlling module 7 is deactivated and the speed has a trend tending to follow a reference speed which in the shown example has a gradually decreasing trend.

Thrust Amplifying Module 10

The thrust amplifying module 10 supplies an auxiliary torque T" command which is added to the primary torque T' as determined by the control module 7. The module 10 is configured for intervening, in other words supplies the auxiliary torque T" command, independently from the control module 7. Therefore, the module 10 can intervene both during the thrust step and when the user does not apply any thrust.

The auxiliary torque T" can be for example used also during the transient step when the user exerts the thrust, and the module 7 is deactivated, in order to enable the vehicle to reach accelerations greater than the ones it would reach by the user thrust alone. Therefore, the auxiliary torque T" can be determined:

based on the thrust $F_k$ as determined by the module 8. For example, the secondary torque T" can increase as such thrust increases; and/or based on the path slope $\vartheta$, if it is available the sensor for determining it. For example, if the thrust is exerted when the vehicle goes along an upgrade, the torque T" can supply a support greater than the one which it would supply on a level surface.

Optionally, as previously discussed, the auxiliary torque T" can be further determined as a function of a parameter k adjustable by the user. For example, modifying the parameter k enables to select whether eliminating or increasing the contribution of the auxiliary torque T", all conditions being equal.

Figure 5:
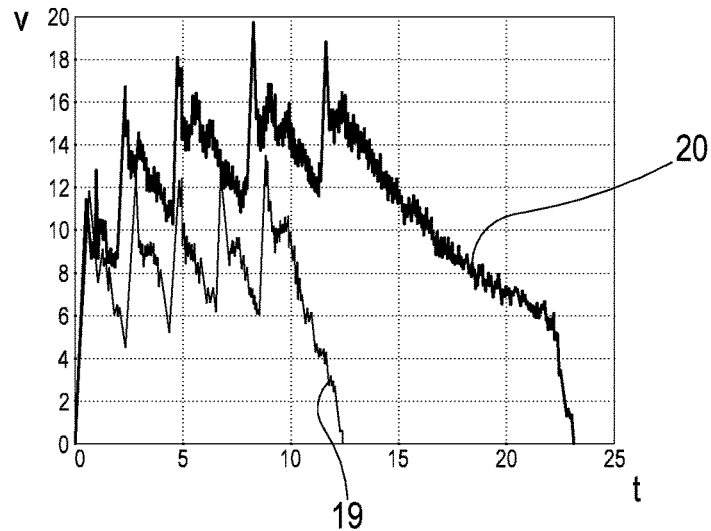
FIG. 5 illustrates a possible comparison between the speed v of an impulsive-type human-powered vehicle equipped with a system according to the invention, and the same vehicle without such system all conditions being equal during the time t.

FIG. 5 shows a comparison between the speed of a vehicle without the control system according to the invention (curve 19) and the speed of a vehicle provided with the control system 1 all conditions being equal, wherein however, the amplifying module 10 is absent and therefore it is not present the contribution of the auxiliary torque T". During the thrust step, the acceleration in both cases is the same. Instead, when the thrust is absent, the control system 1 enables to extend the deceleration step with respect to the case without the control system. Therefore, in correspondence of each following thrust step, speeds greater than the ones without control are obtained since the starting speeds when the thrust is applied are increasingly greater.

In case the amplifying module 10 is present, generally in correspondence of each thrust step, the accelerations will be greater, and therefore during such steps the speed slope curve will be greater.

A person skilled in the art, from the above description, could appreciate how the system according to the invention enables to provide an assistance to the motion of an impulsive-type vehicle without requiring specific user interfaces. In fact, the system is capable of determining the presence or absence of the user thrust and is capable of activating therefore the motor control. So the user can use his/her vehicle without worrying about intervening on particular commands. Therefore, the vehicle can be driven in a way completely similar to the same vehicle without such system. Consequently, despite the assistance, the driver has the feeling of driving a vehicle without any supports.

Since the presence/absence of a thrust is determined as a function of a balance of the forces acting on the same vehicle, instead of a simple analysis of the vehicle speed plots for example, the system is reliable and capable of avoiding erroneous activations, caused for example by particular configurations of the road surface, which could cause sudden accelerations and decelerations.

Moreover, the system is also capable of recognizing negative forces—and therefore brakings—and consequently is capable of managing the activation/deactivation without requiring for example sensors for measuring the braking.

Despite the fact that in the present description it has been made reference to a driving torque of the motor, it is observed that in case of motors of different type, for example linear motors, the control can be applied to the motor driving force rather than to the driving torque.

A person skilled in the art, in order to satisfy specific contingent needs, can introduce several additions, modifications, or substitutions of the elements with other operatively equivalent, to the embodiments, without falling out from the scope of the accompanying claims.

The invention claimed is:

1. A system for controlling a motion of an impulsive thrust human-powered vehicle, comprising:
    a motor associable to a driving element of the vehicle and configured to generate a total torque/driving force;
    a system for storing energy to be supplied to the motor;
    a sensor for detecting a vehicle longitudinal speed and configured to generate a signal representative of the vehicle longitudinal speed;
    a control module for controlling a main torque/driving force of the motor based on at least the signal representative of the vehicle longitudinal speed;
    a determination module for determining a vehicle longitudinal acceleration and configured to generate a signal representative of the vehicle longitudinal acceleration; and
    an estimation module for estimating a presence or absence of a thrust by a user on the vehicle by a balance of forces acting on the vehicle estimated based on at least the signal representative of the vehicle longitudinal acceleration, the estimation module configured for supplying to the control module an activation signal when the estimation module estimates the absence of the thrust by the user.

2. The system according to claim 1, comprising an inertial measuring unit configured to detect a vehicle longitudinal acceleration and for generating a signal representative of the detected vehicle longitudinal acceleration, wherein the determination module is configured for generating the signal representative of the vehicle longitudinal acceleration based on the signal representative of the detected vehicle longitudinal acceleration or based on the signal representative of the vehicle speed.

3. The system according to claim 2, wherein the inertial measuring unit is further configured to detect a vehicle vertical acceleration and for generating a signal representative of the vehicle vertical acceleration, the inertial measuring unit implementing a sensor for detecting a slope of a path which the vehicle moves along.

4. The system according to claim 1, further comprising a sensor for detecting a slope of a path which the vehicle moves along, configured to generate a signal representative of the slope.

5. The system according to claim 4, wherein the estimation module is configured for estimating the presence or absence of the thrust of the user further based on the signal representative of the slope for determining a force of gravity acting on the vehicle.

6. The system according to claim 1, wherein the control module comprises a module for generating a vehicle reference speed based at least on the signal representative of the vehicle longitudinal speed and a module for a closed-loop control of the vehicle speed, configured to determine the main torque/driving force based on the signals representative of the vehicle reference speed and speed.

7. The system according to claim 6, wherein the estimation module is configured for determining a coasting down function representative of friction forces acting on the vehicle further as a function of the vehicle reference speed.

8. An impulsive thrust human-powered vehicle comprising at least one driving element and a system according to claim 1.

9. The system according to claim 1, wherein the estimation module is further configured to supply to the control module a deactivation signal when the estimation module estimates the presence of the thrust by the user.

10. The system according to claim 9, further comprising a thrust amplifying module configured to:
control an auxiliary motor torque/driving force in addition to the main torque/driving force; and
amplify an effect of the thrust of the user in a time period when the thrust of the user is supplied.

11. The system according to claim 1, further comprising a thrust amplifying module configured to:
control an auxiliary motor torque/driving force in addition to the main torque/driving force; and
amplify an effect of the thrust of the user in a time period when the thrust of the user is supplied.

12. The system according to claim 11, wherein the thrust amplifying module is configured for determining the auxiliary torque/driving force further as a function of the signal representative of a slope of a path which the vehicle moves along.

13. The system according to claim 11, wherein the thrust amplifying module is configured for determining the auxiliary torque/driving force further as a function of a parameter adjustable by the user.

14. The system according claim 1, wherein the estimation module is configured to estimate the presence or absence of the thrust of the user on the vehicle by the balance of the forces acting on the vehicle estimated based on:
a mass of the vehicle;
the signal representative of vehicle longitudinal acceleration;
a coasting down function representative of friction forces acting on the vehicle based on the signal representative of the vehicle longitudinal speed; and
the total torque/driving force of the motor.

15. The system according to claim 14, wherein the coasting down function is a predetermined function correlating to each other the vehicle speed and the friction forces.

16. The system according to claim 14, wherein the estimation module is configured for estimating the coasting down function as a function of the vehicle longitudinal speed and the total torque/driving force of the motor.

17. The system according to claim 14, wherein the balance of the forces acting on the vehicle is calculated according to the following formula:

$$M\dot{v} = -\eta(v) + F_k + F_{mot}$$

wherein:
M is the mass of the vehicle;
$\dot{v}$ is the vehicle longitudinal acceleration;
$\eta(v)$ is the coasting down function;
$F_k$ is the thrust of the user to be calculated; and
$F_{mot}$ is the total torque/driving force of the motor.

18. The system according to claim 14, further comprising a sensor for detecting a slope of a path which the vehicle moves along, configured to generate a signal representative of the slope,
wherein the estimation module is configured to estimate the presence or absence of the thrust of the user on the vehicle by the balance of the forces acting on the vehicle estimated further based on the signal representative of the slope for determining a force of gravity acting on the vehicle.

19. The system according to claim 18, wherein the estimation module is configured for estimating the coasting down function as a function of the vehicle longitudinal speed, of the total torque/driving force of the motor, and of the slope of the path.

20. The system according to claim 18, wherein the balance of the forces acting on the vehicle is calculated according to the following formula:

$$M\dot{v} = -\eta(v) + F_k + F_{mot} - Mg\sin(\vartheta)$$

wherein:
M is the mass of the vehicle;
$\dot{v}$ is the vehicle longitudinal acceleration;
$\eta(v)$ is the coasting down function;
$F_k$ is the thrust of the user to be calculated;
$F_{mot}$ is the total torque/driving force of the motor; and
$Mg\sin(\vartheta)$ is a contribution of the force of gravity.

* * * * *